(12) United States Patent
Girard et al.

(10) Patent No.: US 9,061,244 B2
(45) Date of Patent: *Jun. 23, 2015

(54) SYSTEM FOR REDUCING NOX IN EXHAUST

(75) Inventors: James W. Girard, Vienna (AT);
Giovanni Cavataio, Dearborn, MI (US);
Christine Kay Lambert, Dearborn, MI (US); Rachel Alison Snow, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

This patent is subject to a terminal disclaimer.

(21) Appl. No.: 13/548,090

(22) Filed: Jul. 12, 2012

(65) Prior Publication Data

US 2012/0275978 A1 Nov. 1, 2012

Related U.S. Application Data

(62) Division of application No. 12/242,450, filed on Sep. 30, 2008, now Pat. No. 8,225,597.

(51) Int. Cl.
*F01N 3/00* (2006.01)
*B01D 53/94* (2006.01)
*F01N 3/20* (2006.01)
(Continued)

(52) U.S. Cl.
CPC ........ *B01D 53/9409* (2013.01); *B01D 53/9477* (2013.01); *B01D 53/9495* (2013.01); *B01D 2251/2062* (2013.01); *B01D 2251/2067* (2013.01); *B01D 2255/20738* (2013.01); *B01D 2255/20746* (2013.01); *B01D 2255/50* (2013.01); *B01D 2255/9022* (2013.01); *B01D 2258/012* (2013.01); *B01D 2258/014* (2013.01); *F01N 3/035* (2013.01); *F01N 3/2066* (2013.01); *F01N 3/208* (2013.01); *F01N 2370/04* (2013.01); *F01N 2560/06* (2013.01); *F01N 2610/02* (2013.01); *Y02T 10/24* (2013.01); *F01N 13/0097* (2014.06); *F01N 13/0093* (2014.06)

(58) Field of Classification Search
USPC .................. 60/274, 286, 295, 297, 301, 303; 422/169, 171, 177
See application file for complete search history.

(56) References Cited

U.S. PATENT DOCUMENTS 4,499,317 A 2/1985 Liu et al.
5,275,795 A 1/1994 Montreuil et al.
(Continued)

FOREIGN PATENT DOCUMENTS

JP 1139144 A 5/1989

*Primary Examiner* — Binh Q Tran
(74) *Attorney, Agent, or Firm* — Julia Voutyras; Alleman Hall McCoy Russell & Tuttle LLP

(57) ABSTRACT

A system and method for NOx reduction is described, with a catalytic unit including a first zeolite catalyst with a first NOx conversion performance in a first temperature range and a second NOx conversion performance, lower than said first NOx conversion performance, in a second temperature range. The catalytic unit also comprises a second zeolite catalyst with a third NOx conversion performance, lower than said first NOx conversion performance, in the first temperature range and a fourth NOx conversion performance, higher than said second and third NOx conversion performances in the second temperature range, said first temperature range being higher than said second temperature range. The system further includes a controller configured to adjust an amount of reducing agent added to the NOx reducing system responsive to a temperature of the catalytic unit.

17 Claims, 4 Drawing Sheets

(51) Int. Cl.
*F01N 13/00* (2010.01)
*F01N 3/035* (2006.01)

(56) References Cited

U.S. PATENT DOCUMENTS

| | | | |
|---|---|---|---|
| 5,354,720 A | 10/1994 | Leyrer et al. | |
| 5,443,803 A * | 8/1995 | Mizuno et al. | 423/213.2 |
| 5,516,497 A | 5/1996 | Speronello et al. | |
| 5,587,137 A | 12/1996 | Swaroop et al. | |
| 6,074,973 A | 6/2000 | Lampert et al. | |
| 6,133,185 A * | 10/2000 | Kinugasa et al. | 502/67 |
| 6,182,444 B1 * | 2/2001 | Fulton et al. | 60/277 |
| 6,750,168 B2 | 6/2004 | Yan et al. | |
| 6,823,660 B2 * | 11/2004 | Minami | 60/280 |
| 7,506,502 B2 * | 3/2009 | Nakano et al. | 60/285 |
| 7,571,601 B2 * | 8/2009 | Lee | 60/286 |
| 7,743,602 B2 | 6/2010 | Kalyanaraman et al. | |
| 7,803,338 B2 * | 9/2010 | Socha et al. | 423/239.1 |
| 8,105,544 B2 * | 1/2012 | Ohno et al. | 422/171 |
| 8,261,532 B2 * | 9/2012 | Fukuda et al. | 60/285 |
| 8,341,943 B2 * | 1/2013 | Nagaoka et al. | 60/295 |
| 2006/0286012 A1 | 12/2006 | Socha et al. | |

* cited by examiner

SYSTEM FOR REDUCING NOX IN EXHAUST

CROSS REFERENCE TO RELATED APPLICATIONS

The present application is a divisional of U.S. patent application Ser. No. 12/242,450 filed Sep. 30, 2008, the entire contents of which are incorporated herein by reference for all purposes.

FIELD

The present description relates generally to an exhaust treatment system for a combustion engine.

BACKGROUND/SUMMARY

Nitrogen oxides, such as NO and $NO_2$ (collectively referred to as NOx), generated in the high temperature and high pressure conditions of an internal combustion engine, may constitute a large percentage of total exhaust emissions. Accordingly, engine exhaust systems may utilize selective catalytic reduction (SCR) to reduce the NOx species to diatomic nitrogen and water.

A variety of SCR catalysts have been developed including base metal catalysts and zeolite catalysts. However, the inventors herein have recognized several issues with such catalysts. Specifically, the catalysts may have limited operating temperature ranges, varying thermal durability, and may suffer from ammonia slip. As one example, copper-exchanged zeolites may efficiently reduce NOx at lower temperatures. However, at higher temperatures, they may oxidize the reducing agent leading to poor NOx conversion.

In one example, some of the above issues may be addressed by a system for a vehicle including an engine having an exhaust, the system comprising a NOx reducing system coupled to the engine exhaust. The NOx reducing system may include a catalytic unit with a first zeolite catalyst with a first NOx conversion performance in a first temperature range and a second NOx conversion performance, lower than said first NOx conversion performance, in a second temperature range. The catalytic unit may also include a second zeolite catalyst with a third NOx conversion performance, lower than said first NOx conversion performance, in the first temperature range and a fourth NOx conversion performance, higher than said second and third NOx conversion performances in the second temperature range, said first temperature range being higher than said second temperature range. The system may further comprise a controller configured to adjust an amount of reducing agent added to the NOx reducing system responsive to a temperature of the catalytic unit.

In one example, the catalytic unit may include a first Fe-exchanged zeolite catalyst with a (first) higher NOx conversion performance in the first higher temperature range. However, in a second lower temperature range, the Fe-exchanged zeolite catalyst may have a (second) substantially lower performance. The catalytic unit may also include a second Cu-exchanged zeolite catalyst with a (third) lower performance in the aforementioned higher temperature range, but may be configured to have a (fourth) higher performance in the aforementioned lower temperature range. In other words, the first zeolite catalyst may be configured with a higher optimal operating temperature range while the second zeolite catalyst may be configured with a lower optimal operating temperature range.

In this way, by combining catalysts with differing NOx conversion performances in differing operating temperature ranges, and by adjusting reducing agent delivery responsive to catalyst temperature, a catalyst combination with a substantially broader operating temperature range and a significantly improved NOx conversion performance over that broad operating temperature range may be generated. By using such an improved catalyst combination in a NOx reducing system, the quality of exhaust emissions may be improved. Further, by adjusting an amount of reducing agent delivered, for example by increasing reducing agent delivery at higher temperatures, increased NOx performance over the broader temperature range can be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
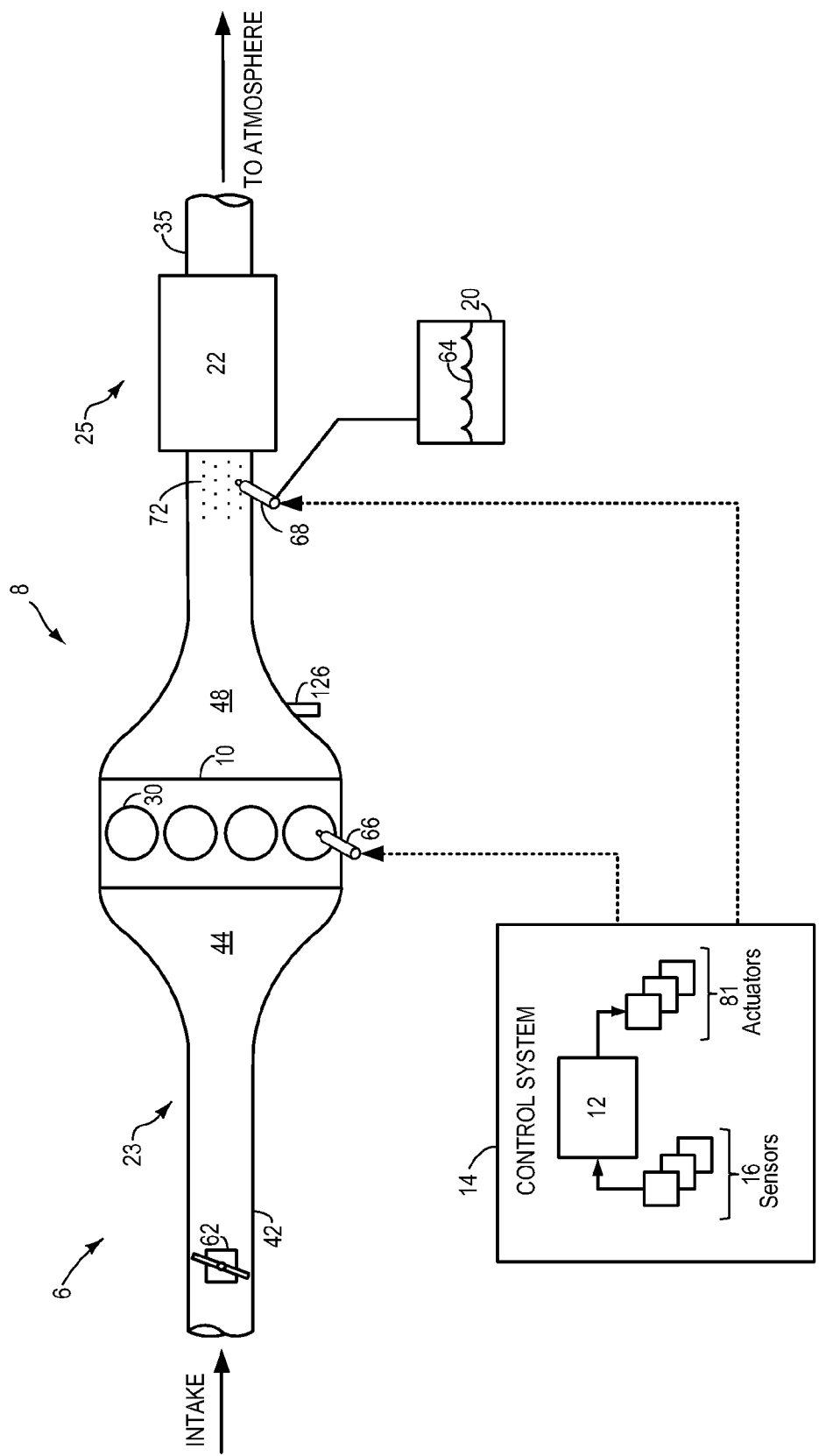
FIG. 1 shows a schematic depiction of an engine and an associated NOx reducing system.
Figure 2:
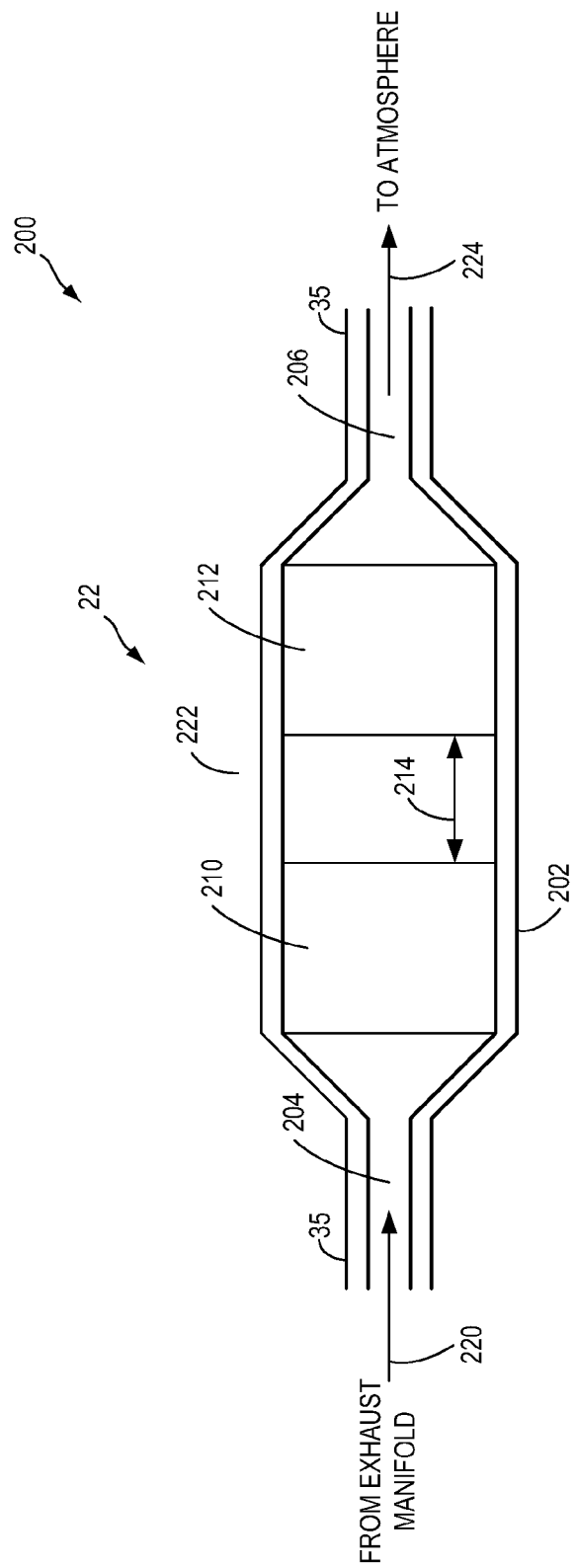
FIG. 2 shows an embodiment of the NOx reducing system of FIG. 1.
Figure 3A:
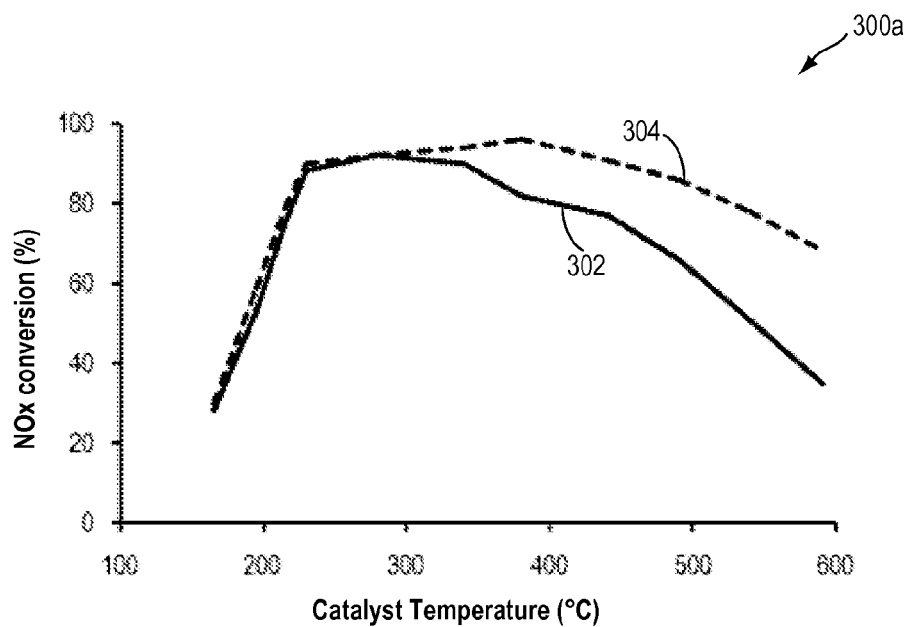
FIG. 3A shows a graphical comparison of NOx conversion performances as a function of catalyst temperature for a gas flow treated over a copper-zeolite catalyst versus a copper-zeolite/iron zeolite combination catalyst of the NOx reducing system of FIG. 2.
Figure 3B:
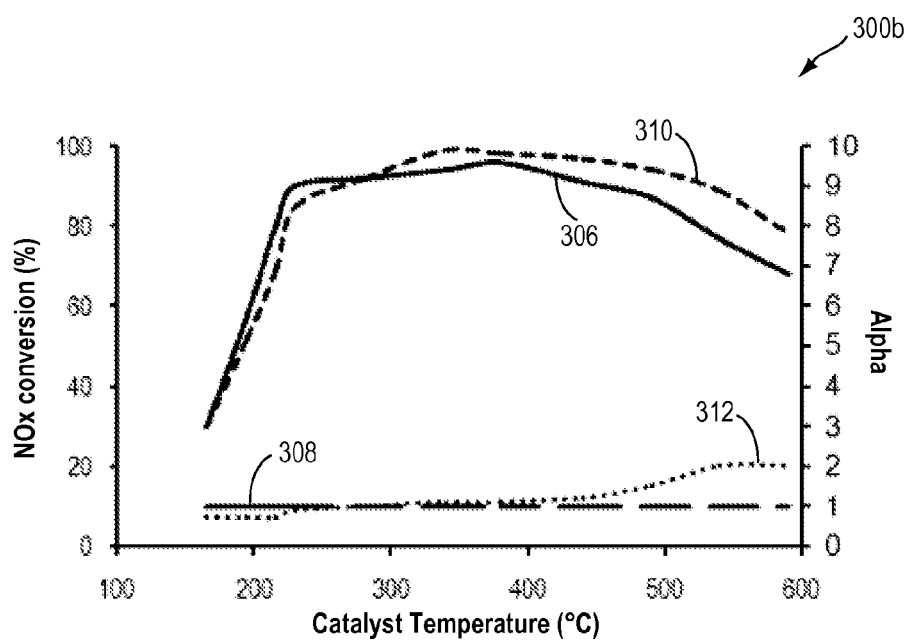
FIG. 3B shows a graphical comparison of the NOx conversion performance of the copper-zeolite/iron zeolite catalyst combination at a fixed alpha value versus a temperature-dependent alpha value.
Figure 4:
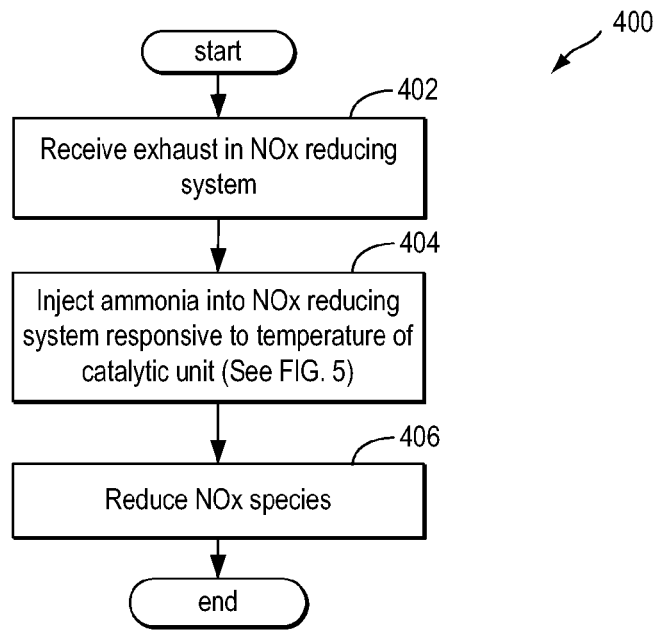
FIG. 4 shows a high level flow chart for NOx reduction in the NOx reducing system of FIG. 2.
Figure 5:
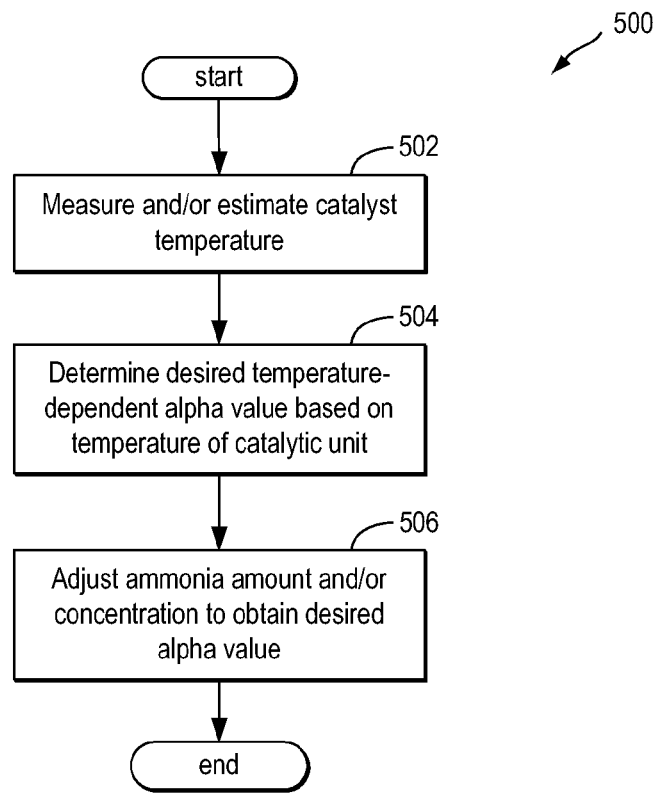
FIG. 5 shows a high level flow chart for generating the temperature-dependent alpha curve of FIG. 3B.

The following description relates to systems and methods for optimizing NOx reduction in a NOx reducing system coupled to an engine exhaust, as shown in FIG. 1. In one example, a zeolite-based NOx reducing system including a combination of different zeolite catalysts may be used, as shown in FIG. 2. The zeolites may be staged in the NOx reducing system such that the majority of benefits of each individual zeolite catalyst may be taken advantage of, and additional synergistic benefits may also be achieved. As shown in FIGS. 3A-B, the reducing capability of the catalyst combination may be further enhanced by adjusting the amount of reducing agent (for example, ammonia) added to the NOx reducing system so as to vary an alpha value (that is, a ratio of the reducing agent to NOx species) responsive to a temperature of the NOx reducing system. FIGS. 4-5 describe routines enabling the mentioned temperature-dependent alpha value adjustment. Thus, by combining different zeolite catalysts with differing characteristics, an improved NOx reducing system may be formed. By further adjusting an amount of reducing agent added responsive to the temperature of the NOx reducing system, or a component thereof, such as the catalytic unit, the overall NOx conversion performance of the catalysts may be further enhanced. In this way, the quality of exhaust emissions may be significantly improved.

FIG. 1 shows a schematic depiction of a vehicle system 6. The vehicle system 6 includes an engine system 8 coupled to a NOx reducing system 22. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices, which may be mounted in a close-coupled position in the exhaust. The one or more emission control devices may include NOx reducing system 22. Additional emission control devices (not shown) may include a three-way catalyst, a diesel particulate filter, oxidation catalyst, etc. It will be appreciated that other components may be included in the engine such as a variety of valves and sensors.

NOx reducing system 22 may include a plurality of zeolite-based catalysts, as further elaborated in FIG. 2, to perform a selective catalytic reduction (SCR) of the NOx species of an exhaust entering the system. Specifically, the catalysts promote the reaction of a reducing agent 64, such as ammonia, with nitrogen oxides (NOx) to form nitrogen and water selectively over the competing reaction of oxygen and the reducing agent. The NOx reducing system may include a first zeolite catalyst with a first NOx conversion performance in a first temperature range and a second NOx conversion performance, lower than said first NOx conversion performance, in a second temperature range. The system may also include a second zeolite catalyst with a third NOx conversion performance, lower than said first NOx conversion performance, in the first temperature range and a fourth NOx conversion performance, higher than said second and third NOx conversion performances, in the second temperature range. As such, the first temperature range may be higher than the second temperature range. Further details regarding the composition and configuration of NOx reducing system 22 is elaborated below with reference to FIG. 2.

Reducing agent 64 may be added to the exhaust gas just before it enters NOx reducing system 22. The liquid reducing agent 64 may be injected into the exhaust by reducing agent injector 68, in an atomized or mist form 72, in response to a signal from an engine control system. The reducing agent may be stored in reducing agent tank 20. A valve (not shown) and/or a pump (not shown) may be used to control flow and pressure of the reducing agent into injector 68.

In one example, reducing agent 64 may be anhydrous or aqueous ammonia. While it may be desirable to provide ammonia in excess of the stoichiometric amount required to react completely with the nitrogen oxides present and drive the reaction to completion, the discharge of the excess unreacted ammonia (known as ammonia slip) may itself degrade emissions quality. Thus, in one example, ammonia may be added in an amount to provide an ammonia to NOx ratio (or alpha value) ranging from 0.5 to 2.0 moles of ammonia per mole of NOx. Other alpha value ranges may be similarly configured responsive to a desired operating temperature and the composition of the catalysts in the NOx reducing system. Even during reaction in the presence of stoichiometric or sub-stoichiometric levels of reducing agent, ammonia slip may occur due to incomplete mixing of the reducing agent with the catalyst. In alternate embodiments, the reducing agent may be any other ammoniagenic agent. As such, ammoniagenic agents may be capable of generating ammonia under specified conditions. As one example, the ammoniagenic agent may include aqueous urea or ammonia.

A fuel system (not shown) may be provided including one or more pumps for pressurizing fuel delivered to the injectors of engine 10, such as the example injector 66 shown. While only a single injector 66 is shown, additional injectors may be provided for each cylinder. The fuel system may be a returnless fuel system, a return fuel system, or various other types of fuel system.

The vehicle system 6 may further include control system 14. Control system 14 is shown receiving information from a plurality of sensors 16 and sending control signals to a plurality of actuators 81. As one example, sensors 16 may include exhaust gas sensor 126 located upstream of the emission control device. Other sensors such as pressure, temperature, air/fuel ratio, and composition sensors may be coupled to various locations in the vehicle system 6. As another example, the actuators may include fuel injector 66, reducing agent injector 68, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 4-5.

A temperature sensor (not shown) may be coupled to the NOx reducing system to monitor a temperature of the system. The temperature may then be communicated with the engine control system. As further elaborated in FIGS. 3B-5, an amount of reducing agent added to the NOx reducing system may be adjusted responsive to the temperature of the catalytic unit of the NOx reducing system to augment the NOx reducing efficiency of the included zeolite catalysts.

Referring now to FIG. 2, one embodiment 200 of NOx reducing system 22 is described. Untreated exhaust 220 is directed from the engine into NOx reducing system 22, comprising catalytic unit 222, along exhaust passage 35. The untreated exhaust 220 from the engine, in the form of a gas stream (represented by an arrow), is conducted into the catalytic unit 222 along inlet port 204 in the direction indicated by the arrow. In the depicted embodiment, the NOx reducing catalytic unit 222 is housed inside an airtight housing 202, which thereby defines a packing volume occupied by the catalytic unit. Following catalytic treatment in the catalytic unit, treated exhaust gas 224 may be discharged along outlet port 206 into exhaust passage 35, for subsequent venting to the atmosphere.

Catalytic unit 222 may include a first zeolite catalyst 210 and a second zeolite catalyst 212. The first and second zeolite catalysts 210 and 212 may be juxtaposed next to one another. Alternatively, as depicted, the first and second zeolite catalysts may be spaced apart at a distance 214 from each other. In either case, the first zeolite catalyst 210 may be located between the inlet port 204 of the NOx reducing system and the second zeolite catalyst 212; while second zeolite catalyst 212 may be located between the first zeolite catalyst 210 and the outlet port 206 of the NOx reducing system. Further, the first and second zeolite catalysts may be supported by a substrate support. Alternatively, one or more of the first and second zeolite catalysts may be included in the substrate support.

While the depicted embodiment shows the two catalysts in a staged configuration, in alternate embodiments, the two catalysts may be in a layered configuration with the first zeolite catalyst forming an upper layer, and the second zeolite catalyst forming a lower layer. Herein, the second zeolite catalyst may be coated on the substrate support to form the lower layer while the first zeolite catalyst may be coated on the lower layer to form the upper layer.

As such, various embodiments may be possible when using the substrate support with the zeolite catalysts. Further variations may be possible when using various substrate supports. In some embodiments, the substrate support may have a high porosity of 30 to 95%. Further, the high porosity substrate support may be extruded. The extruded support may be catalytically active or non-active for the desired SCR chemical reaction. In still other embodiments, the substrate support may comprise a diesel particulate filter (DPF). The DPF substrate support may include a plurality of channels with alternating ends blocked. By using a DPF substrate support, particulate matter trapping, particulate matter burn-off and NOx reduction may occur simultaneously. Various other suitable particulate filters may alternatively be used.

In one example, the first zeolite catalyst may be included at the outer edge of the substrate support (for example, the high porosity substrate support) while the second zeolite catalyst may be included in the center of the substrate support. In another example, the second zeolite catalyst may be included within the substrate support while the first zeolite catalyst may be coated on top of the second catalyst. In this way, the first and second zeolite catalysts with differing optimal operating temperature ranges, may be used advantageously in a wide variety of configurations.

It will be appreciated that the first zeolite catalyst and second zeolite catalyst herein also refer to the sequence in which the catalysts may be introduced to untreated exhaust gas. Thus, the first zeolite catalyst 210 is also an upstream catalyst, located upstream of the second zeolite catalyst while the second zeolite catalyst 212 is also a downstream catalyst, located downstream of the first zeolite catalyst. It will also be appreciated that herein the terms upstream and downstream may be as sensed in the direction of untreated exhaust flowing through the catalytic unit 222 before being vented to the atmosphere.

In one embodiment, both the first and second zeolite catalysts may be metal-exchanged zeolites. Specifically, both catalysts may be transition metal-exchanged zeolite catalysts. The base zeolite may have a high silica to alumina molar ratio, such as mordenite for example. The high silica to alumina ratio may impart temperature stability to the zeolite and may also increase resistance to sulfurous poisons. The temperature stable base zeolite may further ensure a positive influence on the aging characteristics of the catalysts. The base zeolite may be ion-exchanged with metals such as iron (Fe) or copper (Cu) to generate the metal-exchanged zeolites. As one example, (in the embodiment depicted with respect to FIGS. 3A-B) the first zeolite catalyst 210 may be an Fe-exchanged zeolite catalyst while the second zeolite catalyst 212 may be a Cu-exchanged zeolite catalyst. In alternate examples, vanadium, cobalt, nickel, chromium, or other appropriate metals may be used. As such, the exchanged metal may include the elemental metal itself and/or the metal oxide.

First zeolite catalyst 210 may have a first NOx conversion performance in a first temperature range and a second NOx conversion performance, lower than said first NOx conversion performance, in a second temperature range. Second zeolite catalyst 212 may have a third NOx conversion performance, lower than said first NOx conversion performance, in the first temperature range and a fourth NOx conversion performance, higher than said second and third NOx conversion performances in the second temperature range. As such, the first temperature range may be higher than said second temperature range. As one example, when the first zeolite catalyst is an Fe-exchanged zeolite catalyst and the second zeolite catalyst is a Cu-exchanged zeolite catalyst, the first catalyst may exhibit a significantly higher NOx conversion performance in a higher temperature range of 450° C. to 600° C., while the second catalyst may exhibit a significantly higher NOx conversion performance in a lower temperature range of 200° C. to 400° C. That is, in the upper temperature range the Fe-exchanged zeolite may be primarily responsible for reduction of the NOx species, while in the lower temperature range the Cu-exchanged zeolite may be primarily responsible for reduction of the NOx species.

While the example illustrates non-overlapping temperature ranges, in alternate embodiments, the temperature ranges may be partially overlapping. Herein, by placing the first zeolite catalyst with the higher performance at the higher temperature range in front of the second zeolite catalyst with the higher performance at the lower temperature range, the second catalyst may be buffered by the first catalyst against high temperature exhaust gas entering the catalytic unit 222. In this way, the second zeolite catalyst may be buffered from hot exhaust gas by the first zeolite catalyst and detrimental effects of the hot exhaust gas on the second catalyst may be averted.

As such, by themselves, Cu-exchanged zeolite catalysts may be more active at lower temperature ranges and thus may be desirable for use when the exhaust gas temperature is below 400° C., for example. However, at higher temperature ranges, Cu-exchanged zeolite catalysts may tend to selectively oxidize the reducing agent, for example ammonia, to nitrogen. The resultant drop in ammonia concentration may then adversely affect the catalytic efficiency of the Cu-exchanged zeolite catalyst. In contrast, by themselves, Fe-exchanged zeolite catalysts may be more active at higher temperature ranges, efficiently converting NOx species at temperatures above 450° C., and even as high as 600° C. However, at lower temperatures, particularly in the absence of any $NO_2$ species, their efficiency may drop significantly. Further, the Fe-exchanged zeolite catalysts may suffer from ammonia slip. Nonetheless, when the different zeolite catalysts are combined, as claimed herein, the temperature range of the catalytic unit over which significant NOx reduction may occur can be substantially broadened, as further illustrated with respect to FIG. 3A. For example, upon combination, the catalytic unit may operate in a temperature range stretching from about 200° C. to 600° C. Specifically, in the lower temperature range, when the Fe-exchanged zeolite catalyst is substantially inactivated, the Cu-exchanged zeolite catalyst may be activated to reduce NOx species, while in the higher temperature range, when the Cu-exchanged zeolite catalyst is substantially inactivated, the Fe-exchanged zeolite catalyst may be activated and may take over the function of reducing NOx species. A lower threshold of the combination catalyst temperature range may be low enough to efficiently reduce exhaust from diesel engines, while an upper threshold of the temperature range may be high enough to efficiently reduce exhaust from gasoline-based engines. Additional synergistic benefits may also be achieved by combining the different metal-exchanged zeolite catalysts. As one example, the catalyst combination may not suffer from ammonia slip, even when overdosed with ammonia.

The Fe-exchanged and/or Cu-exchanged zeolite catalysts of the present disclosure may be generated by layering catalyst coatings on a substrate support. The iron and/or copper containing zeolite catalysts may be ground to a fine powder for generating the catalyst coatings in slurry form. The catalytic coatings may then be applied to structure reinforcing carriers made of refractory ceramic material such as corderite, mullite or alumina. Alternatively, the carrier may be made of metallic foil, silicon carbide, etc. The carriers may also be high porosity substrate supports, with a porosity ranging between 30 to 95%. In one example, the substrate support may be high porosity cordierite. Further still, the carriers may be in monolith or honeycomb form.

The ratio of the first and second zeolite catalyst in the catalytic unit may be adjusted based on a desired SCR performance level, as well as a desired operating temperature range for the catalytic unit. In one example embodiment, a molar ratio of the first (Fe-exchanged) zeolite catalyst to the second (Cu-exchanged) zeolite catalyst may be 1:2. In alternate examples, the zeolite catalysts may be in equal molar ratios or with twice as much Fe-exchanged zeolite catalyst as Cu-exchanged zeolite catalyst. Still other combinations may be possible. As such, the copper content of the (second) zeolite catalyst may be in the range of 0.1 to 10.0% by weight while the iron content of the (first) zeolite catalyst may be in the range of 0.1 to 10.0% by weight.

To further enhance the performance of the combination catalyst, a ratio of the amount of reducing agent added to the amount of NOx species present, for example a ratio of ammonia to NOx species (herein also referred to as an alpha value), may be adjusted to a desired ratio. The desired ratio may be determined based on various factors to optimize the performance of the catalytic unit. As illustrated and elaborated below, with reference to FIGS. 3B-5, the alpha value may be adjusted responsive to a temperature of the catalytic unit of the NOx reducing system, to thereby augment the NOx reduction efficiency of the catalytic unit.

In this way, by combining metal-exchanged zeolite catalysts of differing performance characteristics, and differing NOx reduction efficiencies at differing temperature ranges, a NOx reducing catalytic unit of substantially broader operating temperature range may be generated. By covering a broader range, engine exhaust generated from a wide variety of fuels may be treated effectively. Further, the combined system may provide additional benefits that may not be achieved by either catalyst alone, such as higher overall resistance to sulfurous poisons, higher tolerance to overdosing of reducing agent, and negligible ammonia slip.

FIG. 3A shows a map 300a graphically comparing NOx conversion performances of the catalyst combination of the present disclosure versus a copper-exchanged zeolite catalyst, over a wide range of temperatures. The catalyst combination tested herein has a blend of a copper-exchanged zeolite and an iron-exchanged zeolite at a molar ratio of 2:1. The catalyst temperature is plotted along the x-axis while the NOx conversion performance is plotted (as a percentage) on the y-axis.

Simulated gas treatment tests were performed in the furnace of a flow reactor. For ease of experimentation, only NO was used as the representative NOx species. The conditions under which the tests were performed included an inlet gas blend of 14% oxygen ($O_2$), 5% water ($H_2O$), 5% carbon dioxide ($CO_2$), 350 ppm NO, 350 ppm ammonia ($NH_3$) and the balance nitrogen. Gas was blended in a first furnace while the catalyst core was housed in a second (connected) furnace. Ammonia was added to the hot gas mixture at the inlet of the second furnace. The catalyst formulations were coated on 400/4.5 CPSI cordierite substrates. The catalysts were first heat aged for 64 hours at 670° C. The catalyst substrates were then tested at a space velocity of 90,000 $hr^{-1}$ with a flow of 9.66 SLM. The catalyst core temperature was varied between 150° C. and 600° C., in a controlled manner. Following reaction, the gas mixture components were analyzed by Fourier transform infra-red spectroscopy (FTIR) analysis.

As shown in FIG. 3A, at lower temperature ranges (such as, ~150° C. to ~250° C.), the NOx conversion curve 302 (solid line) for the copper-based zeolite catalyst and the NOx conversion curve 304 (dashed line) for the catalyst combination exhibit similar trends. However, as the temperature of the catalyst is raised, a significant difference between their performances may be visible. In particular, the difference in performance between the catalysts may increase from ~5% at 300° C. to ~40% at 600° C., with the catalyst combination substantially out-performing the copper-exchanged zeolite catalyst. Thus, while at higher temperature ranges the copper-exchanged zeolite catalyst suffers from heat inactivation and oxidation of ammonia, in the combination catalyst, this drawback is overcome by the presence of the iron-exchanged zeolite catalyst that takes over NOx reduction as the temperature increases. It will be appreciated that similar results (not shown) may be obtained when comparing the performance of the combination catalyst with an iron-exchanged zeolite catalyst with the combination catalyst substantially out-performing the Fe-exchanged zeolite catalyst at lower temperature ranges.

To further enhance the performance of the catalyst combination, the ratio of ammonia (the reducing agent) to NOx may be further adjusted responsive to a temperature of the catalytic unit of the NOx reducing system. Specifically, the amount of ammonia added to the NOx reducing system may be increased as a temperature of the catalytic unit increases. In some embodiments, the temperature-dependent adjustment may be performed such that when the temperature of the catalytic unit is in a first higher temperature range, the amount of reducing agent added to the NOx reducing system may be increased at a first higher rate. In contrast, when the temperature of the catalytic unit is in a second lower temperature range, the amount of reducing agent added to the NOx reducing system may be increased at a second lower rate. Thus, the temperature-dependent alpha value may be increased with temperature at least in a range of temperatures. For example, the alpha value may be increased with temperature in some temperature ranges (such as at high temperatures) and may not be increased with temperature in other temperature ranges (such as low temperatures). In the example embodiment depicted herein, the amount of ammonia added to the NOx reducing system may be varied at differing rates responsive to the temperature of the NOx reducing system, to provide an alpha value ranging between 0.5 to 2.0 moles of ammonia per mole of NOx. By adjusting the amount of ammonia added responsive to the temperature of the catalytic unit, the NOx conversion reaction may be driven to completion by allowing proper mixing of the nitric oxides with ammonia, without causing ammonia slip. A control system of the engine may be configured to adjust the amount of ammonia added by performing an alpha value adjustment routine 500, as detailed in FIG. 5.

FIG. 3B shows a map 300b graphically comparing NOx conversion efficiencies of the catalyst combination at either a fixed alpha value, or with an adjusted alpha value, over a wide range of operating temperatures. As such, the adjustment to the alpha value may be performed in a temperature-dependent manner. The temperature of the catalyst combination is depicted along the x-axis while the NOx conversion efficiency is plotted (as a percentage) on the primary y-axis. The alpha value is plotted on the secondary y-axis.

The simulated gas treatment tests were performed as previously elaborated with respect to FIG. 3A. NO was used as the representative NOx species and was introduced at a concentration of 350 ppm. When varying the alpha value, the ammonia concentration was adjusted with respect to the NO concentration to generate an alpha value ranging from 0.7 (245 ppm NH$_3$) to 2.0 (700 ppm NH$_3$). When using a fixed value, the alpha value was set at 1.0 (350 ppm NH$_3$).

Map 300b shows a first NOx conversion curve 306 of the combined catalyst wherein the alpha value remains fixed at a value of 1.0, as indicated by fixed alpha curve 308. A second NOx conversion curve 310 for the same combination catalyst is also depicted wherein the alpha value is increased responsive to the temperature of the catalytic unit, as shown by temperature-dependent alpha curve 312. Specifically, the alpha value, and consequently the amount of reducing agent (herein ammonia) added to the NOx reducing system, is increased at different rates responsive to the temperature. In particular, the amount of ammonia added may be increased at different rates in different temperature ranges of the catalytic unit. The amount of ammonia added is increased at a lower rate in a first temperature range comprising lower temperatures while the amount is increased at a higher rate in a second temperature range comprising higher temperatures. While in the depicted embodiment, the temperature-dependent alpha curve follows a non-linear trend, it will be appreciated that in alternate embodiments, the temperature-dependent alpha adjustment may follow a linear, or other appropriate trend.

Comparison of the first NOx conversion curve 306 of the combined catalyst in view of fixed alpha curve 308 versus the second NOx conversion curve 310 in view of temperature-dependent alpha curve 312, indicates that towards the lower threshold of operating temperature ranges for the catalyst combination, only in a small temperature range, no substantial difference in NOx reduction can be observed. However, for the majority of temperatures analyzed, there is a substantial increase in the efficiency of NOx reduction with the temperature-dependent alpha curve. Specifically, when the alpha value is gradually increased as a temperature of the catalyst combination increases in an upper temperature range, there is an overall enhancement in the already high performance characteristic of the catalyst combination. As illustrated, when tested at an upper threshold of the operating temperature range (~600° C.), there may be a significant increase in NOx reduction from ~65% to ~80%. Thus, by increasing an alpha value responsive to the temperature of the catalytic unit, the catalytic performance of the catalytic unit may be augmented.

Given that the Cu-exchanged (second) zeolite catalyst is primarily responsible for NOx reduction in the lower temperature range of the catalytic unit, and the Fe-exchanged (first) zeolite catalyst is primarily responsible for NOx reduction in the higher temperature range of the catalytic unit, the temperature-dependent adjustment of the alpha value correlates with enhanced performance of the respective constitutive catalysts in their respective operating temperature ranges. As such, independent alpha curves may be generated for the different zeolite catalysts constituting the combination catalyst in the catalytic unit. However, by using a single temperature-dependent alpha curve responsive to the operating temperature of the combination catalyst, the high cost and complexity involved in customizing the alpha value with each constitutive catalyst (to thereby achieve overall improved NOx conversion), may be averted.

FIG. 4 depicts an example process flow 400 explaining the NOx reduction process in the example NOx reducing system of FIG. 2. At 402, untreated exhaust gas may be received in the NOx reducing system. At 404, an amount of reducing agent, herein an amount of ammonia, may be injected into the NOx reducing system to obtain a desired alpha value. The amount of ammonia added and the desired alpha value may be adjusted responsive to the temperature of the catalyst combination in the catalytic unit of the NOx reducing system. At 406, the NOx species may be reduced by an SCR reaction in the catalytic unit to thereby generate treated exhaust gas.

FIG. 5 depicts an example alpha adjustment routine 400 that may be performed by a control system of the engine to obtain a temperature-dependent alpha curve as depicted in FIG. 3B. The alpha adjustment enables a desired alpha value to be attained, to thereby optimize the NOx conversion performance of the combination catalyst in the NOx reducing system.

At 502, the combination catalyst temperature may be estimated and/or measured. The temperature may be estimated by a temperature sensor coupled to the catalytic unit. Alternatively, the temperature may be inferred from an engine exhaust temperature, or other operating parameters. At 504, a desired temperature-dependent alpha value (or ammonia to NOx ratio) may be determined based on the estimated catalytic temperature. A look-up table may be previously generated and stored in a memory of the engine control system. The look-up table may be configured to dictate an amount of ammonia (or other reducing agent) to be added responsive to the estimated temperature, or temperature range. Accordingly, at 506, an ammonia amount and/or concentration added to the catalytic unit may be adjusted to obtain the desired alpha value. Specifically, an amount of ammonia added to the NOx reducing system may be increased as the temperature of the catalyst combination (or catalytic unit) increases, at least in a range of temperatures, thereby increasing the alpha value.

As one example, when the catalyst temperature is in a lower temperature range (for example, as may occur when receiving exhaust from a diesel fuel), the alpha value may be adjusted to gradually increase at a lower rate within a sub-stoichiometric range (for example, from 0.5 to 1.0, in particular from 0.7 to 0.9). In alternate examples, the alpha value may remain unchanged in the lower temperature range. In another example, when the catalyst temperature is in a higher temperature range (for example, as may occur when receiving exhaust from a gasoline fuel), the alpha value may be adjusted to gradually increase at a higher rate, within a stoichiometric to above-stoichiometric range (for example, from 1.0 to 2.0).

In this way, by increasing the amount of reducing agent added to the NOx reducing system responsive to a temperature of the catalytic unit of a NOx reducing system, the NOx conversion efficiency of the system may be enhanced.

It will be appreciated that the configurations and process flows disclosed herein are exemplary in nature, and that these specific embodiments are not to be considered in a limiting sense, because numerous variations are possible.

The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a NOx reducing system coupled to an engine exhaust in a vehicle system, comprising:
with a controller of the vehicle system, adjusting an amount of reducing agent added to the NOx reducing system responsive to a NOx reducing system temperature, including increasing the amount added at a first rate at a first temperature, and increasing the amount added at a second rate at a second temperature, said second rate higher than said first rate, said second temperature higher than said first temperature, wherein the NOx reducing system includes a first zeolite catalyst with a first NOx conversion performance at the first temperature and a second NOx conversion performance, lower than said first NOx conversion performance, at the second temperature; and a second zeolite catalyst with a third NOx conversion performance, lower than said first NOx conversion performance, at the first temperature and a fourth NOx conversion performance, higher than said second and said third NOx conversion performances, at the second temperature.

2. The method of claim 1 wherein said first zeolite catalyst is an iron-exchanged zeolite catalyst and said second zeolite catalyst is a copper-exchanged zeolite catalyst.

3. The method of claim 2 wherein the reducing agent is an ammoniagenic agent.

4. The method of claim 2 wherein a molar ratio of the first zeolite catalyst to the second zeolite catalyst is 1:2.

5. The method of claim 1 wherein the first zeolite catalyst is located between an inlet of the NOx reducing system and the second zeolite catalyst, and where the second zeolite catalyst is located between the first zeolite catalyst and an outlet of the NOx reducing system.

6. The method of claim 1 wherein the reducing agent is an ammoniagenic agent including ammonia or aqueous urea.

7. A method for controlling a vehicle engine exhaust, comprising:
with a vehicle controller, increasing an amount of ammoniagenic reducing agent added to a zeolite catalyst NOx reducing system in the exhaust at a first lower rate at a first lower temperature range, and increasing the amount at a second higher rate at a second higher temperature range, wherein a molar ratio of a first, iron-exchanged zeolite catalyst to a second, copper-exchanged zeolite catalyst is 1:2.

8. The method of claim 7 wherein the first zeolite catalyst has a first NOx conversion performance in the first temperature range and a second NOx conversion performance, lower than said first NOx conversion performance, in the second temperature range; and the second zeolite catalyst has a third NOx conversion performance, lower than said first NOx conversion performance, in the first temperature range and a fourth NOx conversion performance, higher than said second and said third NOx conversion performances in the second temperature range.

9. The method of claim 7 wherein the first zeolite catalyst is located between an inlet of the zeolite catalyst NOx reducing system and the second zeolite catalyst, and where the second zeolite catalyst is located between the first zeolite catalyst and an outlet of the zeolite catalyst NOx reducing system.

10. The method of claim 7 wherein the ammoniagenic agent includes ammonia or aqueous urea.

11. A method for controlling an engine exhaust in a vehicle system, comprising:
with a controller of the vehicle system, increasing an amount of ammoniagenic reducing agent added to a zeolite catalyst NOx reducing system in the exhaust at a first lower rate at a first lower temperature range, and increasing the amount at a second higher rate at a second higher temperature range, wherein a first zeolite catalyst has more Fe exchanged zeolite than a second zeolite catalyst, has a higher NOx conversion performance than the second zeolite catalyst at temperatures above a first temperature threshold, and has a lower NOx conversion performance than the second zeolite catalyst at temperatures below a second temperature threshold that is less than or equal to the first temperature threshold.

12. The method of claim 11 wherein the first zeolite catalyst has a first NOx conversion performance in the first temperature range and a second NOx conversion performance, lower than said first NOx conversion performance, in the second temperature range; and the second zeolite catalyst has a third NOx conversion performance, lower than said first NOx conversion performance, in the first temperature range and a fourth NOx conversion performance, higher than said second and said third NOx conversion performances in the second temperature range.

13. The method of claim 11 wherein said second zeolite catalyst is a copper-exchanged zeolite catalyst.

14. The method of claim 11 wherein the first zeolite catalyst is located between an inlet of the zeolite catalyst NOx reducing system and the second zeolite catalyst, and where the second zeolite catalyst is located between the first zeolite catalyst and an outlet of the zeolite catalyst NOx reducing system.

15. The method of claim 11 wherein the ammoniagenic agent includes ammonia or aqueous urea.

16. The method of claim 7, wherein the amount of ammoniagenic reducing agent added to the zeolite catalyst NOx reducing system is adjusted to generate a ratio of ammonia to NOx ranging from 0.7 to 2.0.

17. The method of claim 16, wherein the ratio of ammonia to NOx is increased at the second higher temperature range and remains unchanged at the first lower temperature range.

* * * * *